J. H. SHEEHAN.

Assignor of one-half to E. L. STERNS.

NUT LOCK.

No. 10,578. Reissued Apr. 7, 1885.

Witnesses:

J. H. Clergue.

W. H. Wilson

Inventor:

James Henry Sheehan

By J. R. Mason his atty

N. PETERS, Photo-Lithographer, Washington, D. C.

UNITED STATES PATENT OFFICE.

JAMES HENRY SHEEHAN, OF BANGOR, MAINE, ASSIGNOR OF ONE-HALF TO EZRA L. STERNS, OF SAME PLACE.

NUT-LOCK.

SPECIFICATION forming part of Reissued Letters Patent No. 10,578, dated April 7, 1885.

Original No. 307,147, dated October 23, 1884. Application for reissue filed March 12, 1885.

*To all whom it may concern:*

Be it known that I, JAMES HENRY SHEEHAN, a citizen of the United States, residing at Bangor, in the county of Penobscot and State of Maine, have invented a new and useful Nut-Lock; and I do hereby declare that the following is a full, clear, and exact description of the invention, which will enable others skilled in the art to which it appertains to make and use the same.

My invention consists of an improvement upon a nut-lock invented and patented by me under Letters Patent No. 282,383, dated July 31, 1883. In practice I have found some additional constructions and formations desirable to perfect the operation and effectiveness of my nut-lock.

In the accompanying drawings similar letters refer to corresponding parts throughout the several figures.

Figure 1:
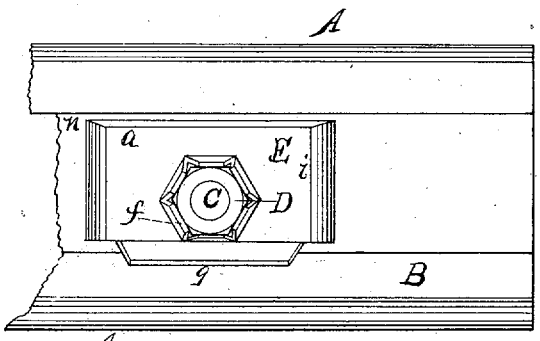
Figure 2:
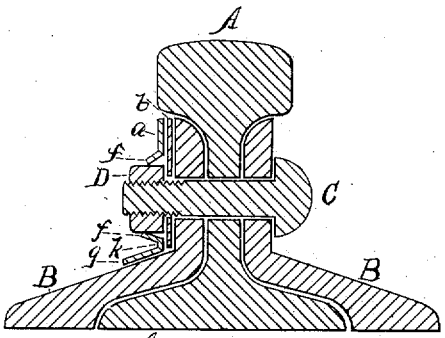
Figure 3:
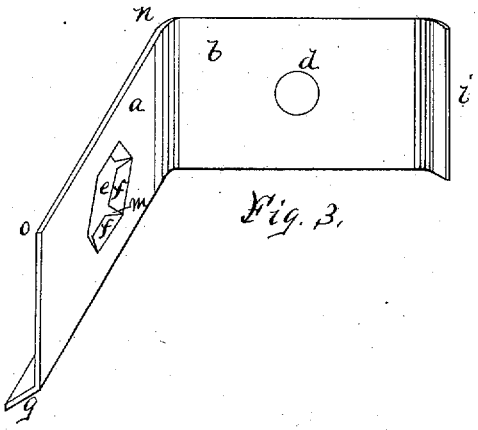

Figure 1 shows an elevation or side view of an ordinary rail with my invention in actual use. Fig. 2 shows a cross-section of a rail and fish-plates with my invention in actual use. Fig. 3 is a front view of my invention with the locking-plate *a* swung out and away from the nut and washer-plate *b*.

A is an ordinary rail for railroad use and purposes. B B are fish-plates. C is a screw-bolt. D is a nut. E is a nut-lock. *a* is the locking or front plate of the lock. *b* is the back plate or washer-plate of the lock. *d* is the aperture in the washer-plate to allow it to pass on over the bolt C. *e* is the flanged aperture of the lock. *f f* are flanges formed on the locking-plate around the aperture *e*. *g* is a flange formed on the outside or locking plate, *a*. *i* is a clamp or lip. *k* is the fold or sharp turn in the formation of the flange *g*. *m m* are slits cut to allow the rim of the nut-aperture to flange without strain on the metal. *o* is the end of the locking-plate *a*.

In cases where my lock is applied to wood I form screw-holes under the nut D, so that the nut D will cover them when in place, and thus prevent any possibility of the screws in the holes ever becoming loose or getting out.

In my former patent, No. 282,383, dated July 31, 1883, I have secured certain parts and operations of a nut-lock, and it is my present intention to secure additional improvements and functions.

In construction I provide a suitable strip of any thin pliable metal—such as galvanized iron—and perforate it to form the circular aperture *d* to pass over the bolt C. I then form the aperture *e* with the flanges or flanged rim *f*, and bend the strip nearly in the middle of its length, as at *n*, to form the washer-plate *b* and the front or locking plate, *a*. The washer-plate *b* is intended to fit on over the bolt and behind the nut D, against the fish-plate B, and to be held in position by the nut D when screwed into place. The front or locking plate, *a*, is intended to be bent or folded back onto the washer-plate *b*, the aperture *e* fitting over the nut D, and the flanges or flanged edges *f* clasping the nut and holding it securely in its proper position, and entirely preventing it from turning or rotating.

In order to secure the outer or locking plate, *a*, and prevent it from slipping off from the nut, I form the lip *i* in extension of the washer-plate *b* of a suitable length to bend over onto and outside of the end *o* of the locking-plate *a*, thus holding the plate *a* securely in place and preventing any possibility of its slipping off the nut. In this nut-lock as described the washer-plate and the locking-plate are integral, and the plates forming the nut-lock operate to prevent any turning or rotation of the nut by the contact of the edges of the plates against the flanges of the rail or the fish-plate, and it is not necessary that there should be two flanges to secure the effective working of the lock; but one flange or any projecting ledge of wood or metal is sufficient; and the washer-plate may be secured by nails or screws through holes to any wood or penetrable substance, and thus act as effectively as if acting against the flange of a rail. In this description of lock the plates are integral.

In forming the locking-plate *a*, owing to recent improvements and changes in fish-plates, the space below the nut D and between the lower side of the nut and the flange of the fish-plate or the flange of the rail may be so far reduced as to render the lower edge of the locking-plate inadequate to resist a proper strain should anything happen to bear upon the nut to turn it, and to provide against this contingency I have improved my former invention by adding a flanged edge, *g*, on the lower edge of the plate, but which may be used indiscriminately on either edge or end. This flange *g* supplies sufficient additional metal to sustain an equal amount of strain with any other side of the locking-plate, because there is no actual limit to the width to which this flange or rim may be extended, and as the rim is integral with the plate it will sustain an equal amount of tensile strain with any other side of the plate, and it makes no difference at what angle the necessities of the case may require it to be bent, the same width and thickness of metal or material naturally sustains and resists the same strain or pressure. I consider this flange *g*, turned up on either edge or end of my locking-plate, a very important improvement, not only upon my own former invention, but upon all previous inventions or devices, patented or otherwise, from the fact that it may be used to support or strengthen a side when the substance of the plate is reduced to a minimum.

What I claim, and desire to secure by Letters Patent, is—

1. In a nut-lock formed with the washer-plate *b* and locking-plate *a* formed integral, the folding lip or clamp *i*, folding or bending down onto or outside of the locking-plate *a* when pressed over the nut D and against the washer-plate *b*, to hold or clamp the plate *a* in position and prevent it from springing off and releasing the nut.

2. In a nut-lock, the combination of the washer-plate *b*, formed with the clamping-lip *i*, to bend or clamp onto the plate *a*, and the nut-locking plate *a*, formed with the flange *g*, when used to form a nut-lock, as shown and described.

JAMES HENRY SHEEHAN.

Witnesses:

HARRY D. STEWART,

ELMER O. GOODRIDGE.